US012621119B2

(12) United States Patent
Smith et al.

(10) Patent No.:  US 12,621,119 B2
(45) Date of Patent:          May 5, 2026

(54) COMMUNICATION OF NETWORK TIME SYNCHRONIZATION

(71) Applicant: Schweitzer Engineering Laboratories, Inc., Pullman, WA (US)

(72) Inventors: Rhett Smith, Odessa, FL (US); Lance G. Dice, Pullman, WA (US); Jason A. Dearien, Moscow, ID (US); Robert Meine, Port Richey, FL (US); Daniel B. Rippon, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 393 days.

(21) Appl. No.: 18/329,012

(22) Filed: Jun. 5, 2023

(65) Prior Publication Data

US 2024/0146497 A1     May 2, 2024

Related U.S. Application Data

(60) Provisional application No. 63/381,018, filed on Oct. 26, 2022.

(51) Int. Cl.
H04L 7/00          (2006.01)
H04L 41/084          (2022.01)
(Continued)

(52) U.S. Cl.
CPC .......... H04L 7/0008 (2013.01); H04L 41/084 (2013.01); H04L 41/0866 (2013.01); H04J 3/0667 (2013.01)

(58) Field of Classification Search
CPC .. H04L 7/0008; H04L 41/084; H04L 41/0866
See application file for complete search history.

(56) References Cited

U.S. PATENT DOCUMENTS

| | | | |
|---|---|---|---|
| 6,747,957 | B1 | 6/2004 | Pithawala |
| 7,218,632 | B1 | 5/2007 | Bechtolsheim |

(Continued)

FOREIGN PATENT DOCUMENTS

| | | |
|---|---|---|
| EP | 2765751 | 8/2014 |
| KR | 20150051107 | 5/2015 |
| WO | 2015038040 | 3/2015 |

OTHER PUBLICATIONS

Wolfgang Braun, Michael Menth, Software-Defined Networking Using OpenFlow: Protocols, Applications and Architectural Design Choices, Future Internet, May 12, 2014.

(Continued)

*Primary Examiner* — Michael Thier
*Assistant Examiner* — Tracy Lauren Raimondo
(74) *Attorney, Agent, or Firm* — Fletcher Yoder, P.C.

(57)          ABSTRACT

Disclosed are systems and methods for configuring time synchronization in a network. The system includes a time signal source to provide a common time signal to multiple configurable communication devices and a network controller in a control plane, in communication with the multiple configurable communication devices. The network controller is configured to receive time signal source information and to receive device configuration information for a first configurable communication device. The network controller is also configured to determine settings for time signal distribution and to transmit the settings to the multiple configurable communication devices to cause the first configurable communication device to transmit the time signal from the time signal source in a data plane for consumption by the multiple configurable communication devices.

16 Claims, 6 Drawing Sheets

(51) Int. Cl.
    *H04L 41/0866*     (2022.01)
    *H04J 3/06*     (2006.01)

(56) References Cited

U.S. PATENT DOCUMENTS

| | | | |
|---|---|---|---|
| 7,376,831 B2 | 5/2008 | Kollmyer | |
| 7,872,983 B2 | 1/2011 | Lai | |
| 8,553,544 B2 | 10/2013 | Lai | |
| 8,800,044 B2 | 8/2014 | Raad | |
| 9,038,151 B1 | 5/2015 | Chua | |
| 9,237,129 B2 | 1/2016 | Ling | |
| 9,286,171 B2 | 3/2016 | Cardona | |
| 9,432,255 B1 | 8/2016 | Hasan | |
| 9,432,380 B2 | 8/2016 | Margalit | |
| 9,680,588 B2 | 6/2017 | Connolly | |
| 9,686,125 B2 | 6/2017 | Smith | |
| 9,769,060 B2 | 9/2017 | Dearien | |
| 9,819,731 B1 | 11/2017 | Austern | |
| 9,923,779 B2 | 3/2018 | Berner | |
| 10,659,314 B2 | 5/2020 | Dearien | |
| 11,023,646 B2 | 6/2021 | Subramanian | |
| 2002/0172157 A1 | 11/2002 | Rhodes | |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2007/0177600 A1 | 8/2007 | Suzuki | |
| 2008/0005558 A1 | 1/2008 | Hadley | |
| 2008/0080384 A1 | 4/2008 | Atkins | |
| 2009/0257743 A1 | 10/2009 | Chung | |
| 2009/0285093 A1 | 11/2009 | Bolt | |
| 2009/0313189 A1 | 12/2009 | Sun | |
| 2010/0241608 A1 | 9/2010 | Huang | |
| 2011/0022734 A1* | 1/2011 | Etheridge | H04J 3/0682 |
| | | | 709/248 |
| 2011/0085567 A1 | 4/2011 | Beecroft | |
| 2011/0087952 A1 | 4/2011 | Marin | |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0250770 A1 | 9/2013 | Zou | |
| 2013/0263247 A1 | 10/2013 | Jungck | |
| 2013/0294228 A1 | 11/2013 | Ahuja | |
| 2014/0025321 A1* | 1/2014 | Spanier | G01R 21/133 |
| | | | 702/62 |
| 2014/0025945 A1 | 1/2014 | McGrew | |
| 2014/0029451 A1 | 1/2014 | Nguyen | |
| 2014/0064100 A1 | 3/2014 | Edwards | |
| 2014/0112130 A1 | 4/2014 | Yang | |
| 2014/0115706 A1 | 4/2014 | Silva | |
| 2014/0129700 A1 | 5/2014 | Mehta | |
| 2014/0153572 A1 | 6/2014 | Hampel | |
| 2014/0160939 A1 | 6/2014 | Arad | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0282021 A1 | 9/2014 | Dolezilek | |
| 2014/0325038 A1 | 10/2014 | Kis | |
| 2014/0325649 A1 | 10/2014 | Zhang | |
| 2014/0371941 A1 | 12/2014 | Keller | |
| 2014/0376406 A1 | 12/2014 | Kim | |
| 2015/0074260 A1* | 3/2015 | Anand B.S. | H04L 41/12 |
| | | | 709/224 |
| 2015/0081762 A1 | 3/2015 | Mason | |
| 2015/0112933 A1 | 4/2015 | Satapathy | |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142427 A1 | 5/2016 | de los Reyes | |
| 2016/0165454 A1 | 6/2016 | Li | |
| 2016/0330076 A1 | 11/2016 | Tiwari | |
| 2016/0337247 A1 | 11/2016 | Yao | |
| 2016/0344592 A1 | 11/2016 | Cook | |
| 2016/0373344 A1 | 12/2016 | Wohlert | |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0111904 A1* | 4/2017 | Bradetich | H04L 47/245 |
| 2018/0109441 A1* | 4/2018 | Meyer | H04L 65/65 |
| 2019/0319836 A1* | 10/2019 | Dos Santos | H04L 45/16 |
| 2021/0194791 A1* | 6/2021 | Mullis | H04L 45/16 |
| 2023/0065686 A1* | 3/2023 | Umasuthan | H04J 3/0667 |

OTHER PUBLICATIONS

Adam Cahn, Juan Hoyos, Matthew Hulse, Eric Keller, Software-Defined Energy Communication Networks: From Substation Automation to Future Smart Grids, Smart Grid Communications, IEEE Oct. 2013.

William J. Dally, Virtual-Channel Flow Control, IEEE Transactions on Parallel and Distributed Systems, vol. 3, No. 2, Mar. 1992.

Sushant Jain, et al., B4: Experience with a Globally-Deployed Software Defined WAN, ACM SIGCOMM Computer Communication Review, vol. 43 Issue 4, pp. 3-14. Oct. 2013.

Matthew Monaco, Oliver Michel, Eric Keller, Applying Operating System Principles to SDN Controller Design, Hotnets '13, Nov. 2013.

Dmitry Drutskoy, Eric Keller, Jennifer Rexford, Scalable Network Virtualization in Software-Defined Networks, IEEE Internet Computing, vol. 17, Issue: 2, Nov. 27, 2012.

Maciej Kuzniar, et al., Automatic Failure Recovery for Software-Defined Networks, HotSDN '13, Aug. 16, 2013.

Tal Mizrahi, Yoram Moses, ReversePTP: A Software Defined Networking Approach to Clock Synchronization, HotSDN '14, Aug. 22, 2014.

Ramon Marques Ramos, et al. SlickFlow: Resilient Source Routing in Data Centere Networks Unlocked by OpenFlow, 2013 IEEE 38th Conference on Local Computer Networks, Oct. 2013.

Ville Torhonen, Designing a Software-Defined Datacenter, Master of Science Thesis, Tampere University of Technology, May 2014.

James S. Thorp, The Protection System in Bulk Power Networks, Power Systems Engineering Research Center, 2003.

Adam Cahn, Software-Defined Energy Communication Networks: From Substation Automation to Future Smart Grids, IEEE Conference, Oct. 21, 2013, p. 560-561.

European Patent Office, Extended European Search Report, Application No. EP23200695, Jun. 17, 2024.

\* cited by examiner

239

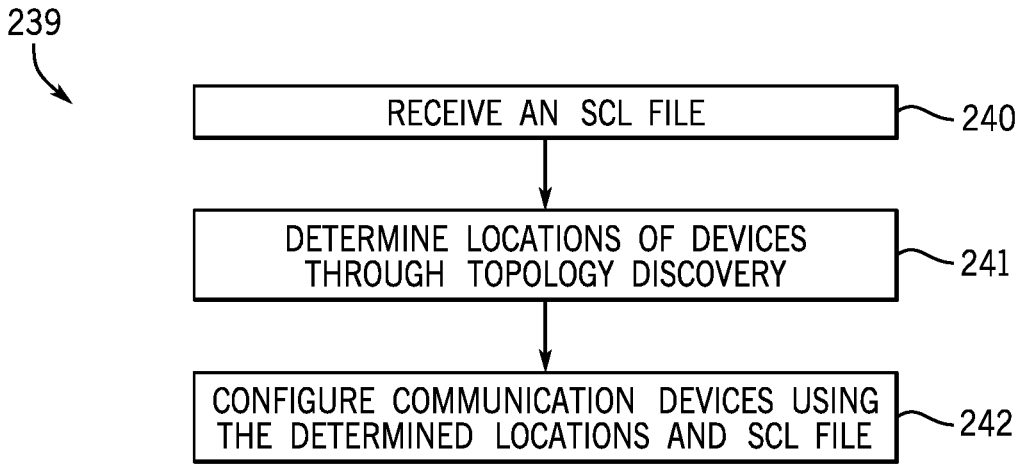

| |
|---|
| RECEIVE AN SCL FILE |
| 240 |

| |
|---|
| DETERMINE LOCATIONS OF DEVICES THROUGH TOPOLOGY DISCOVERY |
| 241 |

| |
|---|
| CONFIGURE COMMUNICATION DEVICES USING THE DETERMINED LOCATIONS AND SCL FILE |
| 242 |

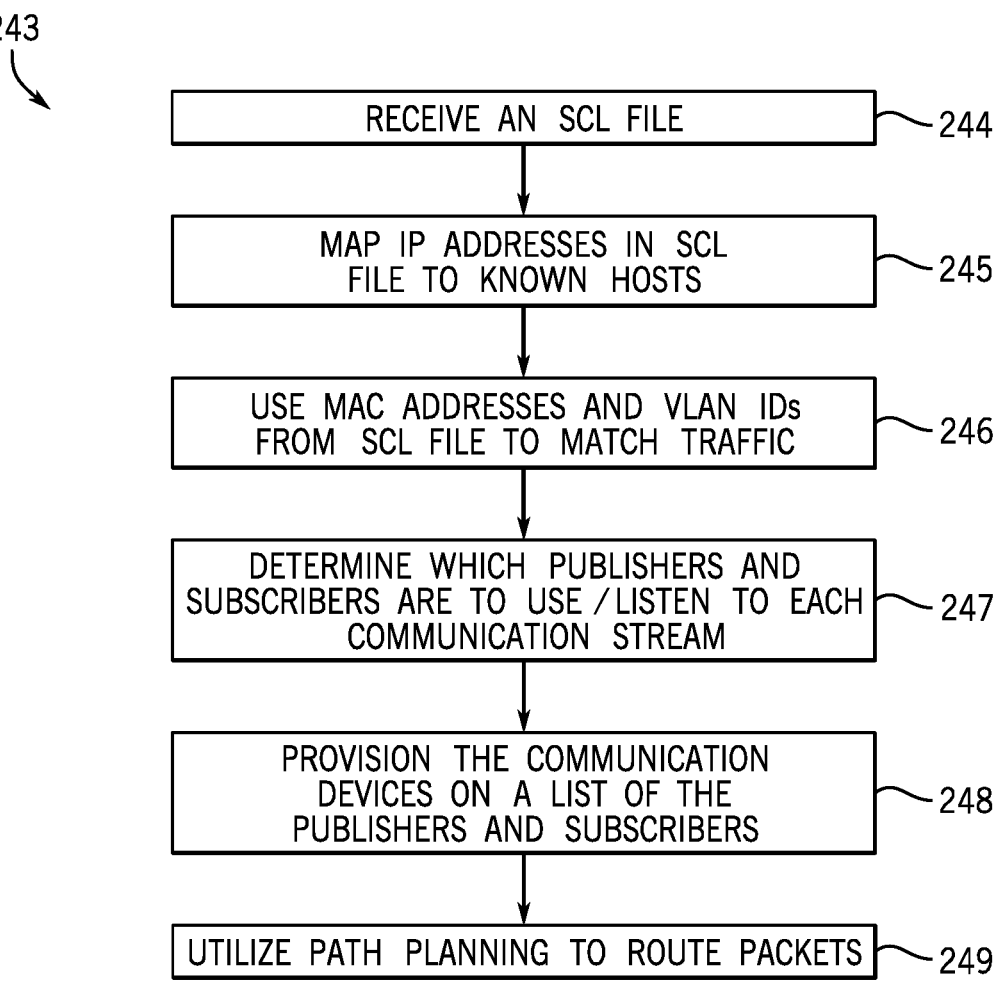

RECEIVE AN SCL FILE ~244

MAP IP ADDRESSES IN SCL FILE TO KNOWN HOSTS ~245

USE MAC ADDRESSES AND VLAN IDs FROM SCL FILE TO MATCH TRAFFIC ~246

DETERMINE WHICH PUBLISHERS AND SUBSCRIBERS ARE TO USE/LISTEN TO EACH COMMUNICATION STREAM ~247

PROVISION THE COMMUNICATION DEVICES ON A LIST OF THE PUBLISHERS AND SUBSCRIBERS ~248

UTILIZE PATH PLANNING TO ROUTE PACKETS ~249

252 — RECEIVE AN SCL FILE

254 — CONFIGURE DEVICES USING SCL FILE

256 — DEVICE OVERSUBSCRIBED THROUGH CONFIGURATION ?

NO

YES

258 — REPORT AND / OR CHANGE ROUTING

260 — CHANGED FROM BASELINE ?

NO

YES

262 — REPORT CHANGES

264 — DETERMINE HEALTH OF THE SYSTEM

COMMUNICATION OF NETWORK TIME SYNCHRONIZATION

CROSS-REFERENCE TO RELATED APPLICATIONS

This application claims priority to U.S. Provisional Application No. 63/381,018, filed Oct. 26, 2022, entitled, "CONFIGURATION OF SYSTEM-WIDE NETWORK TIME SYNCHRONIZATION," the disclosure of which is incorporated by reference herein in its entirety for all purposes.

TECHNICAL FIELD

The present disclosure relates to systems and methods for a communication system that is configured using a configuration file, such as a substation configuration language (SCL) file. More particularly, but not exclusively, a controller uses the configuration file to map communications between devices.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

FIG. 3 illustrates a flow diagram of a process using the control planes of FIG. 1 or FIG. 2 to configure locations from a configuration file in accordance with several embodiments.

FIG. 4 illustrates a flow diagram of a process using the control planes of FIG. 1 or FIG. 2 to provision communication devices based on publisher/subscriber lists in accordance with several embodiments.

DETAILED DESCRIPTION

Figure 1:
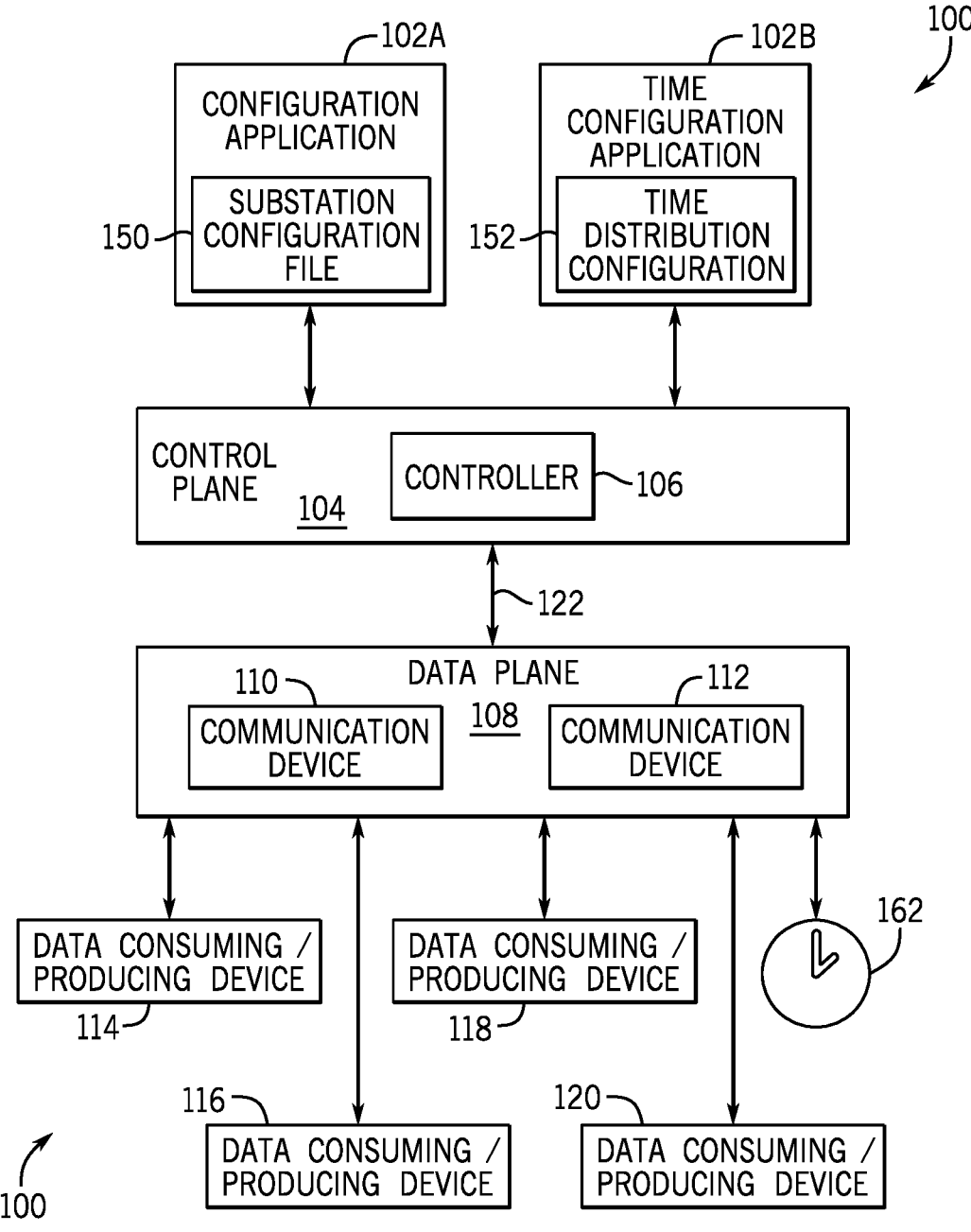
FIG. 1 illustrates an example of a simplified block diagram of a communication network architecture including a configuration application, a control plane, a data plane, a time source, and a plurality of data consuming/producing devices in accordance with several embodiments.

Systems of devices for the protection, control, and automation of industrial and utility equipment may use a communication network to facilitate various operations. The communication network may be configured to provide secure and reliable exchange of data among the various devices. Redundancies may be built into the devices as well as the communication network. Modern electric power distribution and transmission systems may incorporate a variety of communication technologies that may be used in the protection, control, and automation of the power system. The communication networks carry information necessary for the proper assessment of power system conditions and for implementing control actions based on such conditions. In addition, such messages may be subject to time constraints because of the potential for rapid changes in conditions in the electric power system.

Modern electric power distribution and transmission systems may incorporate a variety of communication technologies that may be used in the protection, control, and automation of a power system. The communication networks carry information necessary for the proper assessment of power system conditions and for implementing control actions based on such conditions. In addition, such messages may be subject to time constraints because of the potential for rapid changes and critical nature of proper evaluation of conditions in the electric power system.

In electric power delivery systems, in particular, intelligent electronic devices (IEDs) may be configured to communicate in accordance with a particular protocol such as the International Electrotechnical Commission's (IEC) 61850 protocol that may run over networks utilizing Transmission Control Protocol/Internet Protocol (TCP/IP) or other local area networks that retransmissions when dropped packets occur.

Furthermore, electric power delivery systems may include a large number (e.g., hundreds) of devices with even more (e.g., thousands) of communication circuits. The network(s) using these communication circuits may utilize a deny by default security (or zero trust) ruleset or a plug and play security ruleset. With plug and play security rulesets, new devices may be plugged into the network and allowed access by default. With a deny by default security ruleset, proactive traffic engineering requires that no newly connected devices may be allowed to be part of the network until the device has been authorized with its indicated location. Authorizing each device and/or communication circuit may take a relatively long period of time. What is needed is a tool for path planning in a programmable communication network to facilitate particular communication protocols. Presented herein are systems and methods to manage path planning in a programmable communication network using communication configuration files that comply with particular communication protocols (e.g., IEC 61850 or JavaScript Object Notation (JSON) connection files). In other words, a configuration file of one or more devices (e.g., real-time automation controller and/or other end devices) may store information about devices and network switches. These configuration files may be used to determine which devices/switches should be on the network and where. Thus, when a configuration file is imported and has a device/switch listed in the configuration file, the device may be deemed authorized. Additionally, the configured network may need to distribute a time signal among various devices/switches.

The embodiments of the disclosure can be further understood by reference to the drawings, wherein like parts are designated by like numerals throughout. Components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. Also, the steps of a method do not necessarily need to be executed in any specific order, or even sequentially, nor need the steps be executed only once unless otherwise specified.

Embodiments herein may be described with reference to a software defined network (SDN), spanning tree algorithm (STA), or other such protocols. Unless stated otherwise, the systems and methods described herein may be used with an SDN or another applicable programmable communications network. Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, and the like, that performs one or more tasks or implements particular abstract data types.

In certain embodiments, a particular software module or component may include disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, across several memory devices, and/or may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

In various embodiments, a controller may be used to configure networking devices, establish network flows, and monitor network conditions. SDN networking technologies offer a variety of advantages to electric power systems. For example, SDN networking technologies allow for rapidly configurable deny-by-default security, better latency control, symmetric transport capabilities, redundancy and failover planning, etc. An SDN supports a programmatic change control platform that allows an entire communication network to be managed as a single asset, simplifies the understanding of the network, and enables continuous monitoring of a network. In an SDN, the systems that decide where the traffic is routed (i.e., the control plane) can be distinct from the systems that perform the forwarding of the traffic in the network (i.e., the data plane).

Electric power delivery systems may be configured to comply with standards that allow for interoperability among IED providers. For example, IEDs may be configured to communicate in compliance with the International Electrotechnical Commission (IEC) 61850 standard. In accordance with IEC 61850, an SCL file may be used to include device descriptions and communication parameters among the several IEDs. For example, a Substation Configuration Description (SCD) may include the substation design that includes capabilities of the devices required for the designed system.

In accordance with several embodiments herein, the controller of the communication system may use SCL file(s) such as SCD to configure the communication devices to operate in accordance with the substation design, and to facilitate compliance with the standard.

The control plane may be modified to achieve an optimal or target usage of network resources by creating specific data flows through the communication network. A "flow entry" is used to refer to the set or sets of parameters the control data flows. A "data flow," or simply "flow," is used to refer to any type of data transfer in a network, such as a set or sequence of packets sent from a particular source to a particular unicast, anycast, or multicast destination. Data flow entries may permit specific network paths based on a variety of criteria that offer significant and precise control to operators of the network. In many SDN embodiments, an SDN controller embodies the network control plane and determines how packets (or frames) should flow (or be forwarded) in the network. The SDN controller communicates this information to the networking devices in the data plane by setting their forwarding tables and/or other configuration settings. Accordingly, an SDN enables centralized configuration and management of a network. The data plane in an SDN includes packet forwarding devices with communication interfaces to receive forwarding information from the controller.

One approach to differentiate packets and to forward packets includes VLAN tagging of the packets. A Virtual Local Area Network (VLAN) can segregate traffic in a network with shared topology. Packets may have a VLAN ID or tag to indicate to where the packet should be forwarded. In addition to simplifying management of a network, an SDN architecture also enables monitoring and troubleshooting features that can be beneficial for use in an industrial or utility system.

A variety of communication devices may utilize the various embodiments described herein. A communication device, as the term is used herein, includes any device that is capable of accepting and forwarding data traffic in a data communication network. In addition to the functionality of accepting and forwarding data traffic, communication devices may also perform a wide variety of other functions and may range from simple to complex devices.

Specific examples of communication devices applicable to the systems and methods described herein include, but are not limited to computing devices (e.g., desktop computers, tablets, or other mobile devices such as cellular phones), switches, hubs, repeaters, gateways, routers, network bridges, modems, wireless access points, and line drivers. As used herein the term "communication device" may, as the context allows, also encompass a wide variety of hybrid networking devices such as multilayer switches, protocol converters, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

FIG. 1 illustrates an example of a simplified representation of a communication system architecture 100 that may be used in different operational planes of a communication network. The communications system architecture 100 may include/utilize a configuration application 102A, a time configuration application 102B, a control plane 104, a data plane 108, and one or more data consuming/producing devices 114, 116, 118, and 120 (collectively referred to as data consuming/producing devices 114-120). The configuration application 102A and/or the time configuration application 102B may represent any of a variety of applications for configuring the controller 106 within (or embodying) the control plane 104.

The configuration application 102A and/or the time configuration application 102B may be implemented by a processor in the same device as each other, by a processor in a same device that includes the controller 106, and/or may be implemented using a different electronic device, such as computing device that is communicatively coupled to the device including the controller 106. For instance, a processor used to at least partially implement the controller 106 may be used to execute instructions from memory to implement the configuration application 102A and/or the time configuration application 102B. Additionally or alternatively, a processor external to the controller 106 may be used to execute instructions to implement the configuration application 102A and/or the time configuration application 102B. Regardless of implementation location, such an application can be tailored to fit a wide variety of system needs, including path planning as described herein. In some embodiments, monitoring and configuration functions may be combined into a single application that is capable of performing configuration and monitoring.

A pathway 122 may be used to pass information between the data plane 108 and the control plane 104. In some embodiments, the pathway 122 may be configured to implement an SDN as the control plane 104. The SDN protocol operates on and controls how packets are forwarded by configuring the way switching occurs in the communication system architecture 100. The pathway 122 may thereby direct the traffic to the intended networking devices, such as communication devices 110 and 112 on data plane 108.

As illustrated, the data plane 108 includes communication devices 110 and 112 in communication with one another. In various embodiments, the communication devices 110 and 112 may be embodied as switches, multiplexers, and/or other types of communication devices. The communication links may be embodied as Ethernet, fiber optic, and/or other forms of data communication channels. The data consuming/producing devices 114-120 may represent a variety of devices within an electric power transmission and distribution system that produce or consume data to or from the communication devices 110 and 112.

For example, one or more of the data consuming/producing devices 114-120 may be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 108 using a plurality of data flows implemented by controller.

The configuration application 102A may receive a Substation Configuration Language (SCL) file 150 that includes configuration information in accordance with a standard, such the IEC 61850 standard. The configuration application 102A may be configured to determine a configuration of the communication system to facilitate communication among the data consuming/producing devices 114-120 in accordance with the SCL file 150. As will be discussed in more detail below, the configuration application 102A may further be used to configure the communication network in accordance with SDN, STA, and/or other communication system protocols.

Furthermore, some controllers, such as real-time automation controllers (RTAC) may be able to produce a connection services JSON file. This JSON file has the communication information needed to understand the circuits that are needed to be provisioned between the RTAC and the devices the RTAC is configured to talk to and what protocol the RTAC will use to communicate. This means another controller (e.g., the configuration application 102A) can import this connection services file and determine what circuits are needed. This may baseline the communications to and from the RTAC so all circuits are available and no additional access is provided (e.g., deny by default). This simplifies configuration of the RTAC and then uses the same configuration to automate network engineering. As such, as used herein, an SCL file 150 may include configuration information in a file according to a standard (e.g., IEC 61850) and/or may include a connection services JSON file.

The time configuration application 102B may also be operating in the control plane 104. The time configuration application 102B may obtain information from the data plane 108 (including, for example, on data from/to the various communication devices 110, 112, and data consuming/producing devices 114-120). The time configuration application 102B may include a time distribution configuration module 152 for collecting device information from the various communication devices 110, 112 and data consuming/producing devices 114-120, including setting information. The time distribution configuration module 152 may be implemented using software executed on a processor, hardware circuitry, or a combination thereof. The information may be obtained from the devices themselves, a substation configuration file 150 (or any file containing connection information), user input, or the like. The time distribution configuration module 152 may also receive information from time sources such as a time source 162. The time distribution configuration module 152 may be configured to determine settings and communication flows to facilitate distribution of a time signal (such as a signal from time source 162) across the various communication devices 110, 112 and data consuming/producing devices 114-120. The time distribution may be in accordance with a protocol such as precision time protocol (PTP).

Configuring PTP across an entire system (clocks, switches, end-devices) presents challenges due to device capabilities and required and/or compatible settings. As discussed below, the controller 106 (or other logic/circuitry) can automate this process by determining what devices are on the system and their capabilities and ensuring compatible settings are applied on the clocks, switches, and end-devices. The controller 106 (or other logic/circuitry) may ensure that profiles, profile settings, type-length-values (TLVs), parallel redundancy protocol (PRP) configurations, and security options selected are compatible with devices on the network and the desired application. The controller 106 (or other logic/circuitry) may report any conflicts or issues and report/alarm on time synchronization performance and/or issues.

Electric power delivery systems may include multiple intelligent electronic devices (IEDs) to obtain electrical information therefrom and provide protection, automation, and monitoring functions for the IEDs and the power delivery system in general. The IEDs may be in communication with each other using a network such as a communication network in accordance with the several embodiments herein. Further, an automation controller (such as a real-time automation controller) may be used to facilitate functions of the IEDs. The various IEDs may perform protection and automation functions that may utilize a common time signal. Accordingly, the communication network facilitating communication among the IEDs may be configured to reliably distribute a common time signal. The various embodiments herein provide a system for configuring a communication network to distribute the time signal in a communication network.

Figure 2:
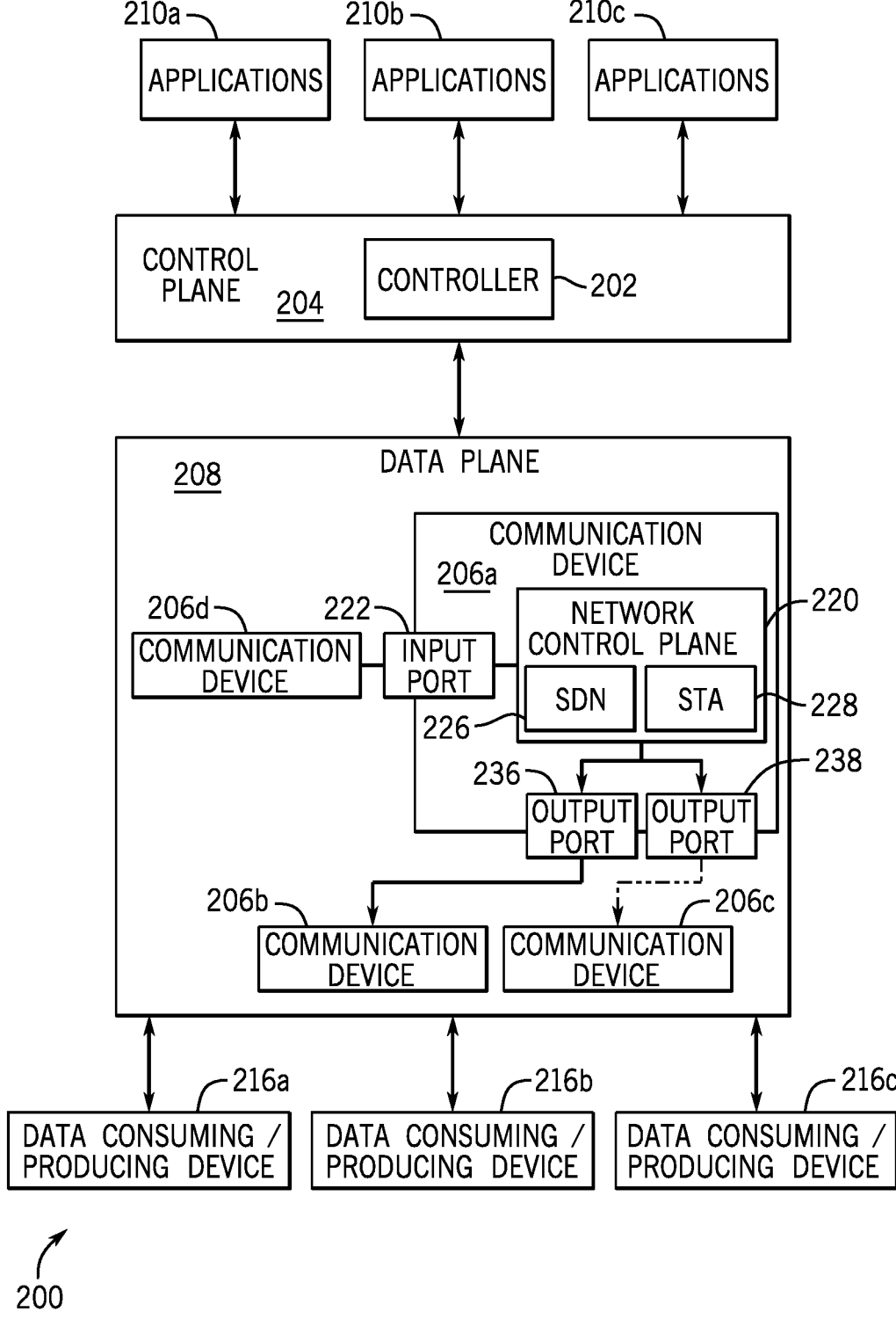
FIG. 2 illustrates a simplified block diagram of a communication system architecture including a functional block diagram of a communication device of the data plane in accordance with several embodiments.

FIG. 2 illustrates a simplified representation of a communications network 200 using communication devices that are configurable to operate in accordance with the control plane implemented on the network by distributing a time signal among the communication devices. The communications network includes a control plane 204 (including controller 202), a data plane 208, and a plurality of data-consuming/producing devices 216a, 216b, and 216c (collectively referred to as data-consuming/producing devices 216). The control plane 204 directs the flow of data through the data plane 208. More specifically, a controller 202 may communicate with a plurality of communication devices 206a, 206b, 206c, and 206d (collectively referred to as communication devices 206) via an interface to establish data flows. The controller 202 may specify rules for routing traffic through the data plane 208 based on a variety of criteria. In some embodiments, applications 210a, 210b, and 210c (collectively referred to as applications 210) may be used to configure the control plane 204, display control plane configuration, display network topology, display communication device data, display communication data, and the like. One such application may be a path planning application used to plan communication paths and/or configure communication devices in accordance with a predetermined protocol.

As illustrated, the data plane 208 includes the plurality of communication devices 206 in communication with one another via a plurality of physical links. In various embodiments, the communication devices 206 may be embodied as switches, multiplexers, and/or other types of communication devices. The physical links may be embodied as Ethernet, fiber optic, and/or other forms of data communication channels.

The communication devices 206 may include various communication ports. Although the ports may be labeled as input port 222 and output ports 236 and 238 for convenience, at least some communication ports may be configured to receive and transmit communication. As illustrated, power delivery devices may include two or more ports (e.g., Ethernet ports) to ensure delivery of critical communications. As illustrated, the communication device 206a includes a network control plane 220 that may include computer instructions operable to cause the communication device 206 to execute communications in accordance with the control plane 204. For example, if the control plane 204 implements a SDN, then the network control plane 220 executes SDN instructions 226 such that the communication switch operates as a SDN switch. Similarly, if the control plane 204 implements a STA network, then the network control plane 220 executes STA instructions 228 such that the communication switch operates as an STA switch. In either case, the control plane 204 implements a control plane that facilitates communications in accordance with the SCL file.

In accordance with several embodiments herein, the communication device 206a may be configured with firmware that is modifiable between different communication plane operations. For example, the communication device 206a may include firmware for use in a SDN using the SDN instructions 226, but modifiable for use in a STA communication network using the STA instructions 228. Additionally or alternatively, the firmware may be modifiable via firmware upgrade. The firmware upgrade may be performed by the controller 202, another networked device, or directly using a device capable of delivering a firmware upgrade. As such, in some embodiments, the SDN instructions 226 and/or the STA instructions 228 may include corresponding firmware executable to operate the communication device 206a in an SDN mode or an STA mode. The communication device 206a may select between the SDN firmware and the STA firmware. The communication device 206a may select the firmware based on a command from the controller 202. The communication device 206a may select the firmware at configuration time so that it may operate correctly in the communications network at run time. In some situations, the communications device 206a may select the firmware depending on a received user configuration. The user configuration may be received via communications, an application, a physical switch on the communication device 206a, or the like.

FIG. 3 is a flow diagram of a simplified process 239 that may be implemented to configure communication devices in communication system architecture 100 of FIG. 1 and/or the communications network 200 of FIG. 2 using configuration files (e.g., SCL files). The controller 106 and/or 202, in accordance with several embodiments herein, may receive an SCL file (block 240). For instance, the controller 106 and/or 202 may import files (e.g., IEC61850 files or JSON connection files) that conform to a known format (e.g., SCL format or JSON format). The controller 106 and/or 202 may use the information in this file to provision circuits using Manufacturing Message Specification (MMS), circuits that implement IE61850-defined Generic Object-Oriented Substation Event (GOOSE) messaging, and Sampled Value (SV) circuits. This provisioning is performed by determining locations of devices though topology discovery and offline configuration capabilities (block 241). Additionally or alternatively, the provisioning is supplemented using and offline configuration capabilities of the devices. The controller 106 and/or 202 then uses these locations to configure communication devices using the determined locations and the SCL file (block 242).

FIG. 4 is a flow diagram of a more detailed process 243 that may be implemented to configure communication devices in communication system architecture 100 of FIG. 1 and/or the communications network 200 of FIG. 2 using configuration files (e.g., SCL files). The controller 106 and/or 202, in accordance with several embodiments herein, may receive an SCL file (block 244). For instance, the controller 106 and/or 202 may import files (e.g., IEC61850 files or JSON connection files from an automation controller) that conform to a predetermined format (e.g., SCL or JSON). The controller 106 and/or 202 may use the information in this file to provision circuits using Manufacturing Message Specification (MMS), circuits that implement IE61850-defined Generic Object-Oriented Substation Event (GOOSE) messaging, and SV circuits. This provisioning is done by reading the SCL file and mapping the IP addresses found in that file to the hosts the controller 106 and/or 202 knows (block 245). When hosts are not found on the physical network that are listed in the SCL file the controller 106 and/or 202 may receive a specification of where that device will be located from a user. By allowing this specification, network engineering may occur before the real device is physically present in the physical network.

This mapping may be used to understand the physical location of each host on the network. Then the controller 106 and/or 202 uses multicast MAC addresses and the VLAN VIDs listed in the SCL file to match traffic (block 246). The SCL file also shares which publishers and subscribers are to listen to each stream of communications which the controller 106 and/or 202 (or other processor) turns into a list of circuits that is to be provisioned. Thus, the controller 106 and/or 202 may determine which publishing and subscribing communication devices are to listen to each communication stream from the SCL file (block 247). Furthermore, in some embodiments, the controller 106 and/or 202 may enable one or more additional publishers and/or subscribers for a communication thread to be specified by a user even when those one or more additional publishers and/or subscribers are not listed in the SCL file. For instance, test sets, engineering laptops, or other monitoring devices may be enabled to listen in on the data over the communication thread. In some embodiments, the controller 106 and/or 202 may read device names from the SCL file and apply those names to the objects and display such correspondence in the configuration application 102A and/or applications 210 for the user to confirm.

The controller 106 and/or 202 may then provision the communication devices on a list of the publishers and subscribers (block 248). For instance, the controller 106 and/or 202 may provision an MMS communication device. MMS communication devices are unicast traffic circuits where each client and server are listed in the SCL file. The controller 106 and/or 202 (or other processor) maps between each client and all servers for a list of circuit requirements. The provisioning allows all clients to be on the same VLAN as all the servers they poll.

As part of the provisioning or using the provisioning, the controller 106 and/or 202 may utilize path planning algorithms to route packets (block 249). For instance, in path planning, the controller 106 and/or 202 may map physical ports to VLAN tag membership and the use of multicast MAC filters to shape the traffic to only pass between publishers and subscribers for GOOSE and SV communication devices operating in STA mode. As previously noted, for MMS communication devices, the controller 106 and/or 202 may allow all clients to be on the same VLANs as all the servers that they poll. For devices operating in SDN mode, path planning, once a path is selected, enters Open-Flow configurations to allow packets to be matched properly to a flow and forwarded to only the subscriber destinations.

In some embodiments, utilizing the path planning may include the controller 106 and/or 202 making bandwidth calculations and using those calculations. For example, the controller 106 and/or 202 may provide or display alarms, errors, and/or warnings based on bandwidth calculations. The software implemented in the controller 106 and/or 202 may have access to what are typical load/performance requirements. For example, a first communication (supervisory control and data acquisition (SCADA) polling data) may have a small load while a second communication (e.g., video streaming) may be relatively large. The controller 106 and/or 202 may use this information for bandwidth load/availability calculations. For example, since the MMS, GOOSE, and SV services are fairly consistent in their bandwidth requirements, the system (e.g., the controller 106 and/or 202) can calculate if the total links provisioned on after the import of the SCL file support the required bandwidth. If the links used for the path planning are close to saturation, a warning can be sent to the user via the configuration application 102A, time configuration application 1028, and/or applications 210. Similarly, if the services require a bandwidth that exceeds any available link bandwidth, an error and alarm can be provided to the user via the configuration application 102A, time configuration application 1028, and/or applications 210.

In some embodiments, utilizing the path planning may include the controller 106 and/or 202 providing warnings and/or errors to the user via the configuration application 102A, time configuration application 1028, and/or applications 210 when SCL files include duplicate addresses, VLAN tags, or multicast destination MAC addresses. These duplicates may cause issues in networks. Catching such duplications before the network is engineered, commissioned, and/or implemented may greatly reduce troubleshooting resources necessary in the future.

In some embodiments, utilizing the path planning may include the controller 106 and/or 202 importing the SCL file and comparing it to the existing network configuration. A comparison highlighting the changes between configurations may be displayed via the configuration application 102A, time configuration application 1028, and/or applications 210. These "tracked changes" may display to the user what the difference is that would have to be made to the configuration to support the new SCL file import. For instance, when a user makes changes to their SCL file(s), it may be advantageous to see how these changes impact the network configuration. This report may be generated before the network changes go into effect enabling an authorized user to double check for any problems before applying the configuration changes. For instance, if a new service (e.g., Voice Over IP (VOIP)) is to be turned on, a physical location is changed, a new device is added, and/or other network-impacting events occur, the controller 106 and/or 202 may show the impact to ensure that only communication devices that should change are actually the only ones being changed.

In some embodiments, utilizing the path planning may include the controller 106 and/or 202 displaying the network physical paths and logical connections in a topology image via the configuration application 102A and/or applications 210. In other words, the result of the configuration may be reported to the user before applying the configuration so the user can validate the translation of the SCL file before deployment or before actual network changes are made.

Figure 5:
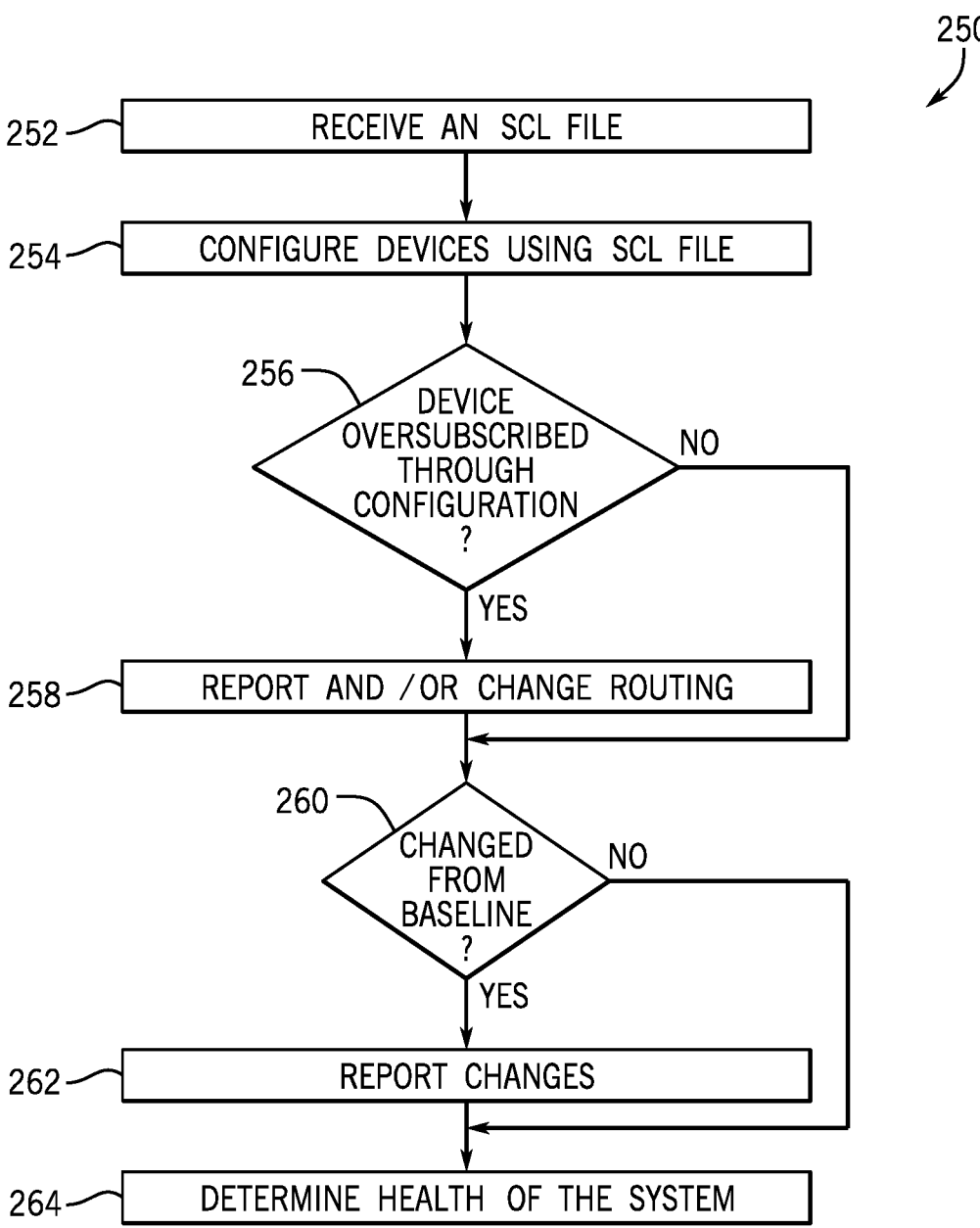
FIG. 5 illustrates a flow diagram of a process using the control planes of FIG. 1 or FIG. 2 to track changes from a baseline and report changes/health of the system in accordance with several embodiments.

As previously noted, the SCL file may be used to audit/report/monitor a communication system (e.g., the communication system architecture 100 of FIG. 1 and/or the communications network 200 of FIG. 2) using the time configuration application 1028. In other words, the information from the SCL files may be applied to automate configuration of auditing, reporting, and/or monitoring by configuring telemetry, alerts, and/or logging, in a network management system (NMS) or similar software and/or hardware. For instance, the NMS, software, and/or hardware may use the automated configuration and report whether the network resources can support the deployment and/or report any other issues before, during, or after deployment and may correct at least some determined issues. As such, FIG. 5 shows a flow diagram of a process 250 that may be utilized by the time configuration application 1028 and/or the controllers 106 and/or 202. The monitoring application 1028 and/or the controllers 106 and/or 202 may receive an SCL file (block 252). For instance, the time configuration application 102B and/or the controllers 106 and/or 202 may import files (e.g., IEC 61850 files or JSON connection files from an automation controller) that conform to a predetermined format (e.g., SCL or JSON). For instance, the JSON connection files may be received from an RTAC connected to the controllers 106 and/or 202. The configuration application 102A, the time configuration application 1028, and/or the controllers 106 and/or 202 may configure the devices as previously discussed (block 254). The time configuration application 1028 and/or the controllers 106 and/or 202 may determine if the configuration (before or after deployment) results in any devices being oversubscribed (block 256). For instance, if Ethernet switches are oversubscribed or the network may not meet latency or other performance requirements, the issues may be reported or addressed (block 258). For instance, the routing may be changed by changing a direction from clockwise to counter clockwise for a ring buffer. Additionally or alternatively, other routing may be deployed to redirect some less critical traffic away from oversubscribed switches through alternative paths.

Automation and/or route planning/changing may also be different for different network types. For STA-based networks, making sure the RTAC is in the same VLAN with every desired destination and for multicast making sure the port VLAN membership matches the desired multicast reach is sufficient due to STA having lower resolution windows into the data when compared to SDN. Route changing may include moving any other potential devices on the VLAN to another VLAN. Automation and/or route planning/changing for SDN may mean path planning to be performed for shortest path between a source and a destination and make sure each switch between the source and the destination has the flows programmed to have the protocol match fields and the forwarding instructions needed to get the packets between the source and destination to support the conversation. Support may include the Address Resolution Protocol (ARP) and unidirectional or bidirectional packets based on Transmission Control Protocol (TCP) or User Datagram Protocol (UDP) demands. When multicast is to be used, the match on the multicast MAC, EtherType, and/or VLAN VID and delivering to all the proper destinations listed in the configuration.

The time configuration application 1028 and/or the controllers 106 and/or 202 may also audit changes by determining a baseline condition. The time configuration application 1028 and/or the controllers 106 and/or 202 may determine when the network changes from this baseline condition (block 260) and may report those changes (block 262). This may be used to enable confirmations that the changes that occur are approved and/or intentional changes rather than accidental changes or a result from an attack on the network.

The time configuration application 1028 and/or the controllers 106 and/or 202 may also be used to determine a health of the system (block 264). For instance, the time configuration application 1028 and/or the controllers 106 and/or 202 may determine health of the communication system architecture 100 of FIG. 1 and/or the communications network 200 of FIG. 2. For instance, automation of network monitoring and telemetry may take the descriptions in the SCL file to provision telemetry and reporting for the communication streams provisioned and used the provisioned telemetry and reporting to determine the health of the system while flagging/alerting/resolving any potential problems. For instance, the time configuration application 1028 and/or the controllers 106 and/or 202 may cause alerts to be raised and/or displayed to a user for specific diagnosed problems. For example, regular events that cease or change period (e.g., periodic 2 second SCADA polls) may be flagged as an issue that needs to be diagnosed, alerted, and/or addressed. Some remediation may take the form of similar changes that occur related to oversubscription. Indeed, latency may be one indicator of the overall health of the system.

Figure 6:
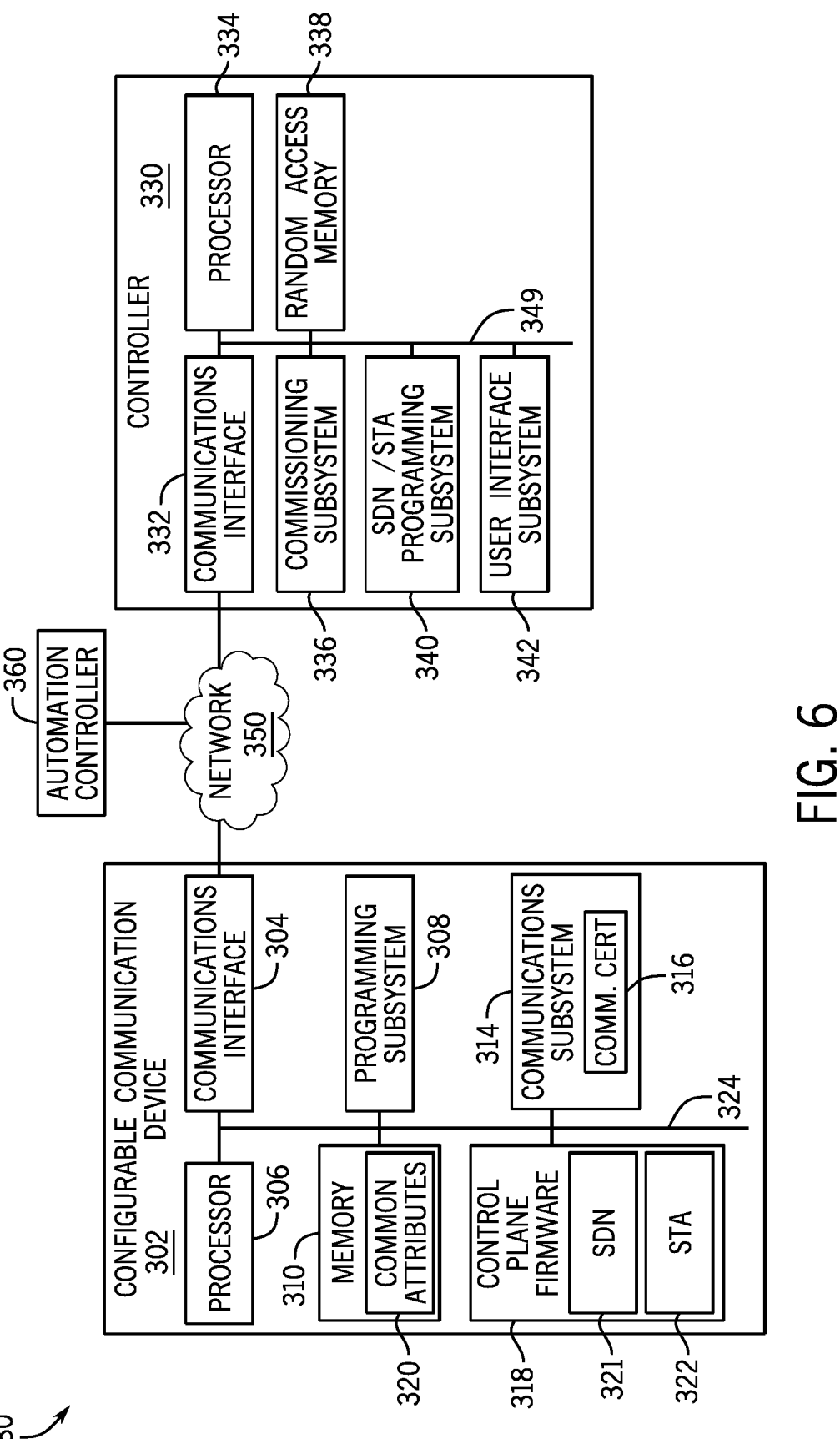
FIG. 6 illustrates functional block diagram of a configurable communications device, controller, and communications network usable in the communication network architecture of FIG. 1 and the communication system architecture of FIG. 2 in accordance with several embodiments.

FIG. 6 illustrates a functional block diagram of a system 300 including a configurable communication device 302 and a communications controller 330 configured to control and configure communications devices consistent with embodiments of the present disclosure. In some embodiments, the configurable communication device 302 and the controller 330 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

The configurable communication device 302 and the controller 330 each include a communications interface 304 and 332, respectively. The communications interfaces 304 and 332 may each be in communication with the communications network 350.

The communication interfaces 304 and 332 may enable the configurable communication device 302 and the controller 330 to respectively interface with various other electronic devices via the network 350 or via other connections. In some embodiments, the communication interfaces 304 and 332 may include an I/O port for a hardwired connection for charging and/or content manipulation using a standard connector and protocol, a universal serial bus (USB), or other similar connector and protocol. The communication interfaces 304 and 332 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), a network employing one of the IEEE 802.15.4 family of protocols, and/or a wide area network (WAN).

Data busses 324 and 349 may facilitate communication among various components of the configurable communication device 302 and the controller 330, respectively.

Processors 306 and 334 may be configured to process communications and to coordinate the operation of the other components of the configurable communication device 302 and the controller 330, respectively. Processors 306 and 334 may operate using any number of processing rates and architectures. Processors 306 and 334 may be configured to perform any of the various algorithms and calculations described herein. Processor 306 may be embodied as a general-purpose integrated circuit, an application specific integrated circuit, a field-programmable gate array, and/or any other suitable programmable logic device. The processors 306 and 334 may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. Instructions to be executed by processors 306 and 334 may be stored in memory 310 and 338, respectively. As such, the memory 310 and 338 may include tangible, computer-readable media including memory or storage that stores instructions or routines to be executed by the processors 306 and 334. The memory 310 and 338 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 306 and 334 to enable the configurable communication device 302 and the controller 330 to perform various functions.

A commissioning subsystem 336 may be configured to commission the configurable communication device 302 when the device is initially connected to the network 350. Commissioning subsystem 336 may specifically be configured to configure the configurable communication device 302 in accordance with the control plane. There may be multiple control plane types in the configurable communication device 302 that may be used in an operational technology (OT) network. For instance, the spanning-tree-managed switches (STA) may use an STA control plane and software-defined networking-managed switches (SDN) may use an SDN control plane. Each management type and control may have value under certain conditions. Therefore, it may useful to provide a single hardware switch that can run multiple control planes.

In one embodiment, the commissioning subsystem 336 may interact with the configurable communication device 302 to select between the SDN firmware 321 and STA firmware 322 in the control plane firmware 318. The configurable communication device 302 may operate in accordance with the selected control plane. In some embodiments, a single firmware may be suitable for implementing SDN and STA control planes. Furthermore, the controller 330 may populate common attributes 320 with attributes that are common between SDN and STA.

An SDN/STA programming subsystem 340 may operate in conjunction with a programming subsystem 308 to program the configurable communication device 302 to communicate with other devices (not shown) connected to network 350. The programming subsystem 308 may receive data flows from SDN/STA programming subsystem 340. The data flows may be modified by the programming subsystem 340 based on conditions of the network 350.

A communication subsystem 314 may be configured to route data communications through the network 350 based on the data flows managed by programming subsystem 308. In some embodiments, a communications certificate 316 may be used to encrypt or authenticate data transmitted by the configurable communication device 302.

A user interface subsystem 342 may be configured to receive user approval of newly detected devices in network 350. In various embodiments, user approval may be required before communication with a new device is permitted. Until communication is enabled by user approval, the new device may be quarantined and may be excluded from communications within the network 350. Such exclusion may be achieved by routing data flows around the new device, blacklisting the new device, and the like until it is permitted on the network 350. As such, the user interface subsystem 342 may include a display. The display may facilitate users to view images. In some embodiments, the display may include a touch screen, which may facilitate user interaction with a user interface. Furthermore, it should be appreciated that, in some embodiments, the display may include one or more liquid crystal displays (LCDs), light-emitting diode (LED) displays, organic light-emitting diode (OLED) displays, active-matrix organic light-emitting diode (AMO-LED) displays, or some combination of these and/or other display technologies. The user interface subsystem 342 may also include input structures. The input structures may include a mouse, keyboard, trackpad, touchscreen, or any other device suitable to enable a user to interact with the user interface subsystem 342 (e.g., pressing a button to increase or decrease a volume level).

The user interface subsystem 342 may enable the controller 330 to interface with various other electronic devices, as may the communications interface 332. In some embodiments, the user interface subsystem 342 may include an I/O port for a hardwired connection for charging and/or content manipulation using a standard connector and protocol, such as a universal serial bus (USB) or other similar connector and protocol.

An automation controller 360, such as a real-time automation controller (RTAC), may be in communication with the network 350. As has been discussed in conjunction with several embodiments, the automation controller 360 may be configured to provide monitoring operations for the network communications. The monitoring operations may include network monitoring, auditing, reporting, resource capability analysis, and the like. The monitoring applications of the automation controller 360 may include several monitoring parameters used to configure the monitoring operations. In accordance with several embodiments herein, the monitoring parameters may be automatically selected using the SCL file. In accordance with certain embodiments, the controller 330 automatically sets the monitoring parameters using information from the SCL file. In accordance with certain embodiments, the SCL may be provided to the automation controller 360 by the controller 330 or another source, and the automation controller 360 may automatically determine the monitoring parameters using information from the SCL file.

Time source 162 is in communication with the configurable communication device 302 to deliver a time signal for distribution on the communication system. The configurable communication device 302 may include a time module 368 that includes settings and instructions for the communication of the time signal. Further, the controller 330 may include a time configuration module 378 that includes instructions for receiving device information from the various devices on the data plane and the data producing/consuming devices. The information may include settings and capabilities of the various devices on the data plane 108. The time configuration module 378 may determine settings and configurations for the various devices to comply with a particular (e.g., desired or selected) time distribution protocol. The time configuration module 378 may then cause the controller 330 (or other logic/circuitry) to distribute the device settings and configuration such that the data plane can distribute the time signal in accordance with the desired protocol.

As such, configuring devices across an entire network may utilize a protocol (e.g., Precision Time Protocol (PTP)) to synchronize clocks, switches, end devices, and/or other devices in the network. However, configuring PTP across an entire system may present challenges due to different device capabilities and/or required settings in the network. A controller (e.g., the controller 106, 202, and/or 330) or other software and/or hardware may address and even at least partially automate configuration of PTP by understanding which devices are on the network and understanding the capabilities and required settings. The controller or other software and/or hardware may then ensure that compatible settings are applied to clocks, switches, and end devices using the configuration information.

Figures 7, 8:
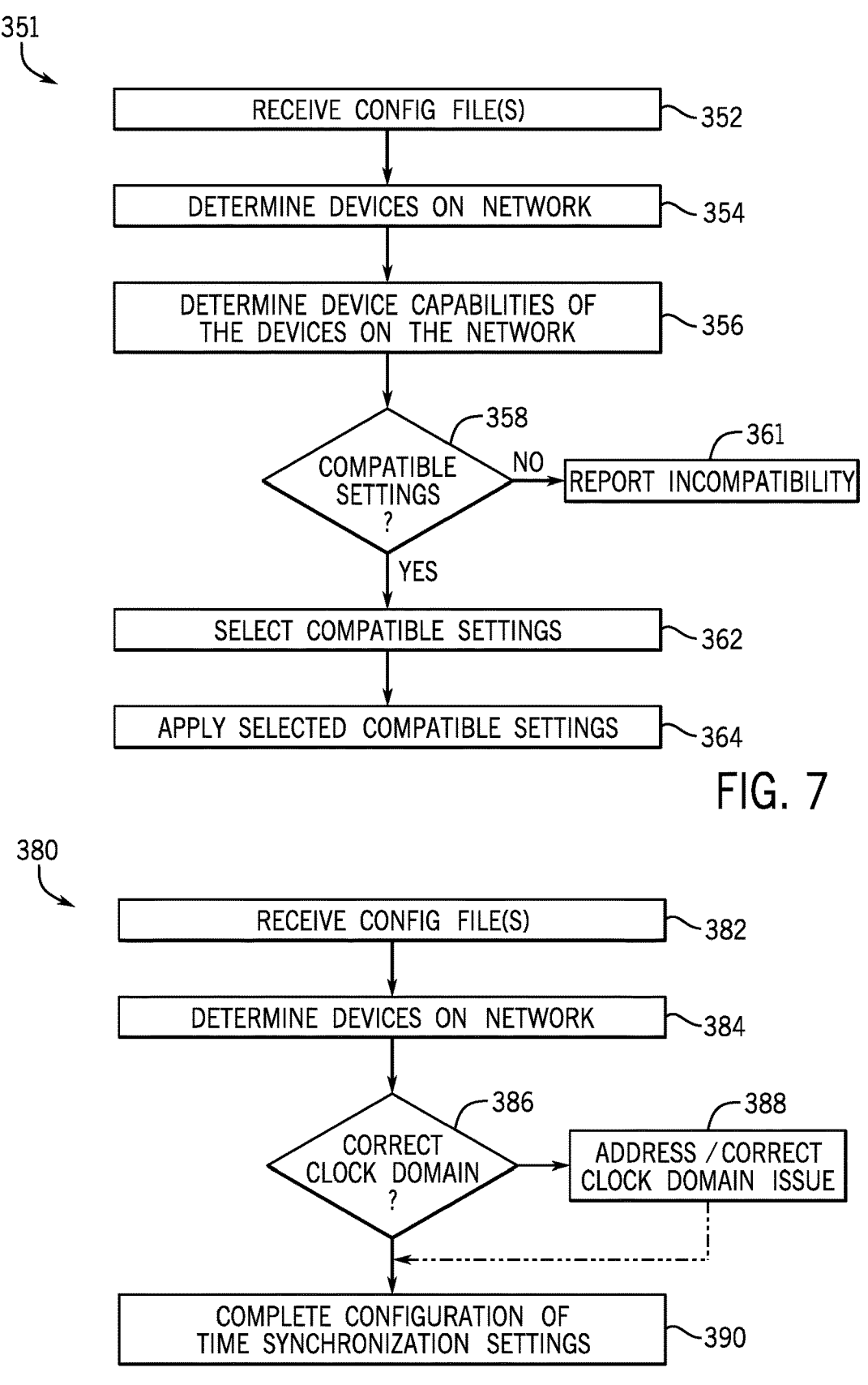
FIG. 7 illustrates a flow diagram of a process for configuring time synchronization settings for using a time signal from the time source of FIG. 1.
FIG. 8 illustrates a flow diagram of a process for correcting clock domain issues in the communication network architecture of FIG. 1 and the communication system architecture of FIG. 2 in accordance with several embodiments.

FIG. 7 is a flow diagram of a process 351 that may be implemented using a controller (e.g., the controller 106, 202, and/or 330) or other software and/or hardware. The process 351 begins with the controller or other software and/or hardware receiving one or more configuration files (block 352). As previously noted, these configuration files may include IEC 61850 SCL files, JSON connection files, or any other suitable files that may store configuration information about devices and/or switches in a network. From the importation of the configuration information in the one or more configuration files, the controller or other software and/or hardware may determine what devices are on the network (block 354). For instance, the one or more configuration files may show that there are multiple controllers (e.g., automation controller 360), end devices, other controllers, other computing devices, network switches, hubs, repeaters, gateways, routers, network bridges, modems, wireless access points, and line drivers. The controller or other software and/or hardware may then use that information to determine the capabilities of the devices on the network (block 356). The capabilities may include required settings that are required for a specific device. By using the known capabilities, the controller or other software and/or hardware may then determine whether there are compatible settings (block 358). Compatible settings may include profiles, profile settings, tag length value encoding, Parallel Redundancy Protocol (PRP) configurations, security options, or other settings within the devices. The controller or other software and/or hardware may determine whether these settings are compatible with each device on the network and/or with a desired application. Although compatibility may be determined for the entire network in some embodiments, in other embodiments, compatibility may be determined for two end devices and the devices between them to ensure that data is passed between them without changing format. If there is an incompatibility between settings of devices or if the settings of a device are unsuitable for a particular application (e.g., SCADA, video streaming, etc.), the controller or other software and/or hardware may report the incompatibility (block 361). For example, an alert/report may be presented via the user interface subsystem 342. Additionally or alternatively, the controller or other software and/or hardware may change settings in the device to change compatibility with other devices or the desired application. For instance, the device may be changed from STA to SDN or vice versa.

If there are compatible settings between the devices and/or with a particular application, the controller or other software and/or hardware may select those compatible settings (block 362). In some embodiments where multiple settings are compatible with the network and/or particular application, the controller or other software and/or hardware may select based on default settings or a prioritized list of settings. Additionally or alternatively, the controller or other software and/or hardware may select compatible settings that have the lowest latency, are the same through the network, or other mechanisms for selecting between multiple permitted compatible settings. The controller or other software and/or hardware then may apply the selected compatible settings to the various devices (block 364).

FIG. 8 is a flow diagram of a process 380 that may be implemented using a controller (e.g., the controller 106, 202, and/or 330) or other software and/or hardware. The process 380 begins with the controller or other software and/or hardware receiving one or more configuration files (block 382). As previously noted, these configuration files may include IEC 61850 SCL files, JSON connection files, or any other suitable files that may store configuration information about devices and/or switches in a network. From the importation of the configuration information in the one or more configuration files, the controller or other software and/or hardware may determine what devices are on the network (block 384). For instance, the one or more configuration files may show that there are multiple controllers (e.g., automation controller 360), end devices, other controllers, other computing devices, network switches, hubs, repeaters, gateways, routers, network bridges, modems, wireless access points, and line drivers. Determining the devices on the network may also include determining communication threads and/or clocking schemes to be used in communication. The controller or other software and/or hardware may then verify whether the communicating devices (e.g., publishers and/or subscribers) in the communication threads utilize a clock in a common domain. For instance, the configuration files show that a time synchronization protocol is to be used with PTP settings of domain zero and a VLAN ID of 100. The controller or other software and/or hardware may then determine whether the devices are on the correct clock domain (block 386). Additionally or alternatively, using the one or more configuration file(s), the controller or other software and/or hardware may determine whether any other time synchronization issues exist. If a device has a wrong domain (or other issue), the controller or other software and/or hardware may address and/or correct the clock domain (or other time synchronization) issue (block 388). For instance, the controller or other software and/or hardware may cause a report to be shown in the user interface subsystem 342 indicating time synchronization performance issues. Additionally or alternatively, the controller or other software and/or hardware may attempt to change the domain to correct a domain issue or may attempt to change any other settings related to other time synchronization issues. If the controller or other software and/or hardware may not correct the time synchronization settings, the process 380 may end. If there are no issues or the controller or other software and/or hardware can resolve the issues, the controller or other software and/or hardware may complete configuration of time synchronization settings for the network (block 390). For instance, the controller or other software and/or hardware may complete configuration of Precision Time Protocol (PTP) settings.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A system for time signal distribution in a programmable communication network, comprising:

a time signal source to provide a common time signal to a plurality of configurable communication devices; and a network controller in a control plane, in communication with the plurality of configurable communication devices, configured to:

receive time signal source information;

receive device configuration information for a first configurable communication device of the plurality of configurable communication devices;

determine settings for time signal distribution;

transmit the settings to the plurality of configurable communication devices to cause the first configurable communication device of the plurality of configurable communication devices to transmit the common time signal from the time signal source in a data plane for consumption by the plurality of configurable communication devices;

determine which of the plurality of configurable communication devices are in the programmable communication network; and determine whether the plurality of configurable communication devices in the programmable communication network is in a correct corresponding clock domain, wherein the network controller is configured to complete configuration of the settings when the plurality of configurable communication devices in the programmable communication network is in the correct corresponding clock domain.

2. The system of claim 1, comprising the first configurable communication device of the plurality of configurable communication devices, wherein the first configurable communication device stores the settings for time signal distribution.

3. The system of claim 1, wherein determining the settings for time signal distribution comprises determining device capabilities of the plurality of configurable communication devices.

4. The system of claim 3, wherein determining the settings for time signal distribution comprises determining whether there are compatible settings among the plurality of configurable communication devices.

5. The system of claim 4, wherein determining the settings for the time signal distribution comprises selecting the compatible settings as the settings for the time signal distribution when there are compatible settings among the plurality of configurable communication devices.

6. The system of claim 4, wherein determining the settings for the time signal distribution comprises reporting incompatibility of the plurality of configurable communication devices when there are no compatible settings among the plurality of configurable communication devices.

7. The system of claim 6, wherein determining the settings for the time signal distribution comprises changing at least one setting of the plurality of configurable communication devices when there are no compatible settings among the plurality of configurable communication devices.

8. The system of claim 1, wherein the network controller is configured to correct clock domain of at least one of the plurality of configurable communication devices when in an incorrect corresponding clock domain.

9. The system of claim 1, wherein determining which of the plurality of configurable communication devices are in the programmable communication network comprises determining which of the plurality of configurable communication devices are in the programmable communication network based on a configuration file.

10. The system of claim 9, wherein configuration file comprises an IEC61850 file that conforms to a Substation Configuration Language (SCL) format or a file that conforms to a JavaScript Notation Object (JSON) format.

11. A method of distributing time signal synchronization signals in a programmable communication network, comprising:

determining devices on the programmable communication network;

determining device capabilities of the devices on the programmable communication network;

determining that there are compatible settings between at least two of the devices on the programmable communication network;

selecting the compatible settings;

applying the compatible settings to cause a distribution of a time signal from a time signal source to the at least two of the devices on the programmable communication network; and reporting incompatibility of at least one device of the devices on the programmable communication network with the compatible settings, wherein the settings of the at least one device is incompatible with the compatible settings; or changing a setting of the at least one device to be compatible with the compatible settings due to the at least one device being incompatible with the compatible settings.

12. The method of claim 11, comprising receiving a configuration file.

13. The method of claim 12, wherein the configuration file comprises an IEC61850 file that conforms to a Substation Configuration Language (SCL) format.

14. The method of claim 12, wherein the configuration file comprises a file that conforms to a JavaScript Notation Object (JSON) format.

15. A system for distributing time signal synchronization signals in a programmable communication network, comprising:

a configurable communication device in a data plane of the programmable communication network; and a network controller in a control plane, in communication with a plurality of network devices that includes the configurable communication device, wherein the network controller is configured to:

receive a configuration file;

determine device capabilities of the plurality of network devices;

determine that the configurable communication device is on a correct clock domain of the programmable communication network; and complete configuration of time synchronization settings of the plurality of network devices to cause distribution of a time signal from a time source to the plurality of network devices, wherein the network controller is configured to correct a clock domain issue of another device of the plurality of network devices before completing configuration of the time synchronization settings.

16. The system of claim 15, wherein completing configuration of the time synchronization settings comprises completing configuration of Precision Time Protocol (PTP) settings.

* * * * *